Aug. 9, 1932.    J. P. SCULL    1,870,755
GLASS WORKING MACHINE
Filed Jan. 12, 1922    5 Sheets-Sheet 1

Aug. 9, 1932. J. P. SCULL 1,870,755
GLASS WORKING MACHINE
Filed Jan. 12, 1922 5 Sheets-Sheet 4

INVENTOR

Aug. 9, 1932.   J. P. SCULL   1,870,755
GLASS WORKING MACHINE
Filed Jan. 12, 1922   5 Sheets-Sheet 5

INVENTOR

Patented Aug. 9, 1932

1,870,755

UNITED STATES PATENT OFFICE

JAMES P. SCULL, OF MILLVILLE, NEW JERSEY, ASSIGNOR TO WHITALL-TATUM COMPANY, OF MILLVILLE, NEW JERSEY, A CORPORATION OF NEW JERSEY

GLASS WORKING MACHINE

Application filed January 12, 1922. Serial No. 528,629.

The present invention relates broadly to glass working machines, and more particularly to machines of this type adapted to produce either pressed or blown glass articles, or glass articles produced both by pressing and blowing.

The machine in connection with which the present invention is illustrated is a machine of the type disclosed in the patent to B. T. Headley and M. C. Bard No. 1,017,870 of February 20, 1912, and reference may be had to said patent for an understanding of the construction and operation of the various details which constitute no important part of the present invention. It will be understood, however, that the invention is not limited in its utility to a combination with the specific machine shown in said patent, the drawings being merely illustrative and not intended to limit my invention.

It has heretofore been customary in the art to which the present invention relates to deliver successive charges of glass to successive molds, certain operations being performed on the charged molds. The glass for such charges has usually been collected on a punty or gathering rod, and brought to a position over the mold to be charged. The operator then rested his punty on a suitable controlling valve which caused shears to close and sever the gather from the punty and permit it to drop through a pouring guide into the mold. The opening movement of the shears has then been effective for moving the pouring guide to inoperative position and for setting the machine in operation. In actual practice, however, it was found necessary to provide for a period of dwell of the shears and pouring guide mechanism over the charged mold to permit the severed end of the glass to fall away into the mold before the cycle of operations was started. This period of dwell has resulted in a retardation of the operating cycles, and a consequent reduction in the output of the machine.

The present invention overcomes the objectionable retardation with machines as commonly used, and provides an independently operated pouring guide which remains over the charged mold and permits the severed glass to drop into the desired mold, while the shears are permitted to start their return movement to open position immediately upon severance of the glass, whereby they may start the cycle of operations of the machine promptly without waiting for the movement of the pouring guide to inoperative position.

The foregoing and other objects of the present invention, together with their attendant advantages will be apparent as the invention becomes better understood from the accompanying specification and drawings forming a part thereof, it being premised that changes may be made in the construction and operation of the invention without departing from the spirit of the invention or scope of my broader claims.

Figure 1:
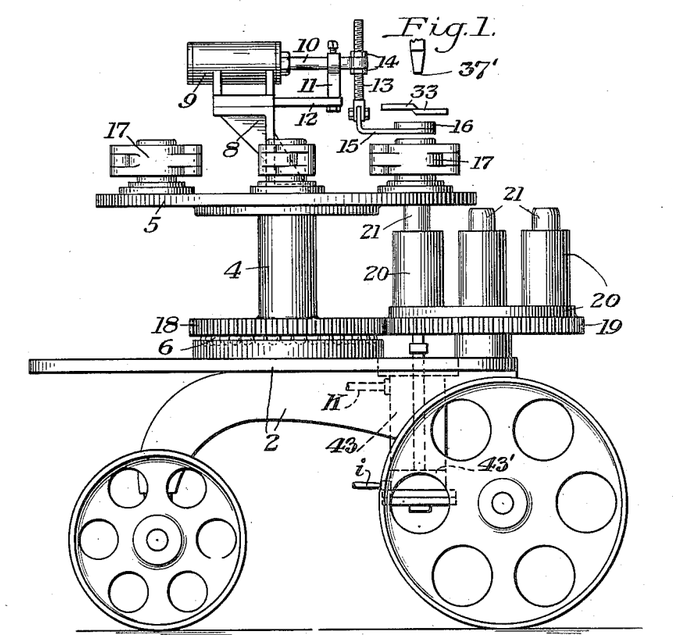
Figure 1 is a side elevation, largely diagrammatic, of a portion of a glass working machine embodying the present invention.
Figure 2:
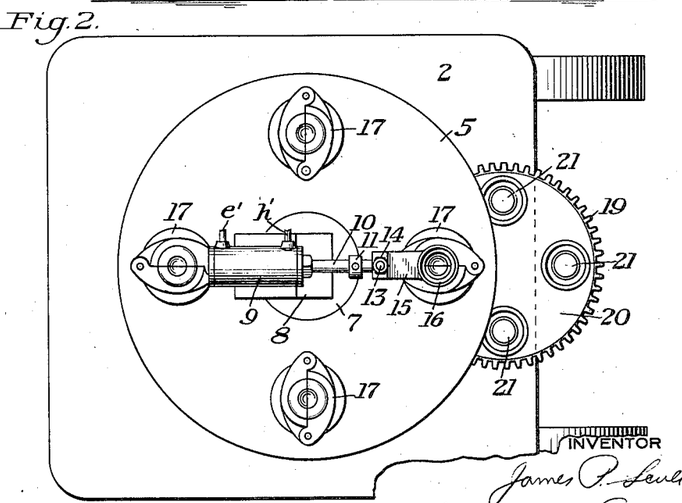
Figure 2 is a top plan view of the construction illustrated in Figure 1, the shears being removed.
Figure 12:
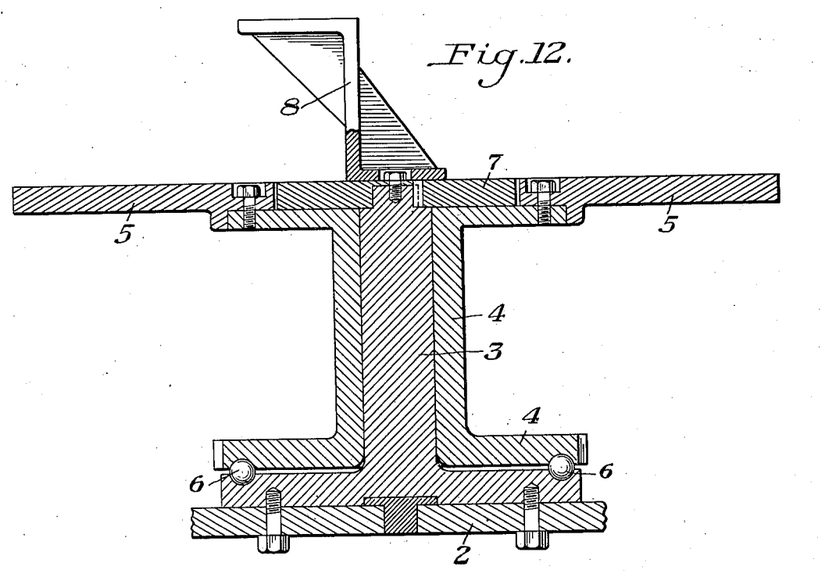
Figure 12 is a vertical sectional view, partly in elevation, through a portion of the machine illustrated in Figure 1.

Referring more particularly to Figures 1, 2 and 12 of the drawings, the glass working machine in connection with which the present invention is illustrated comprises a supporting truck 2 permitting the entire machine to be moved bodily as desired. The truck carries a substantially centrally located upwardly projecting stem 3 having an enlarged base forming a support for a sleeve 4 carrying the table 5. Intermediate the sleeve 4 and the enlarged base of the stem 3 may be provided an antifriction bearing 6 whereby the table may be easily rotated. The stem 3 at its upper end has keyed thereto a disk 7 carrying a bracket 8 which supports a pouring guide operating motor 9.

Figures 3, 4, 5:
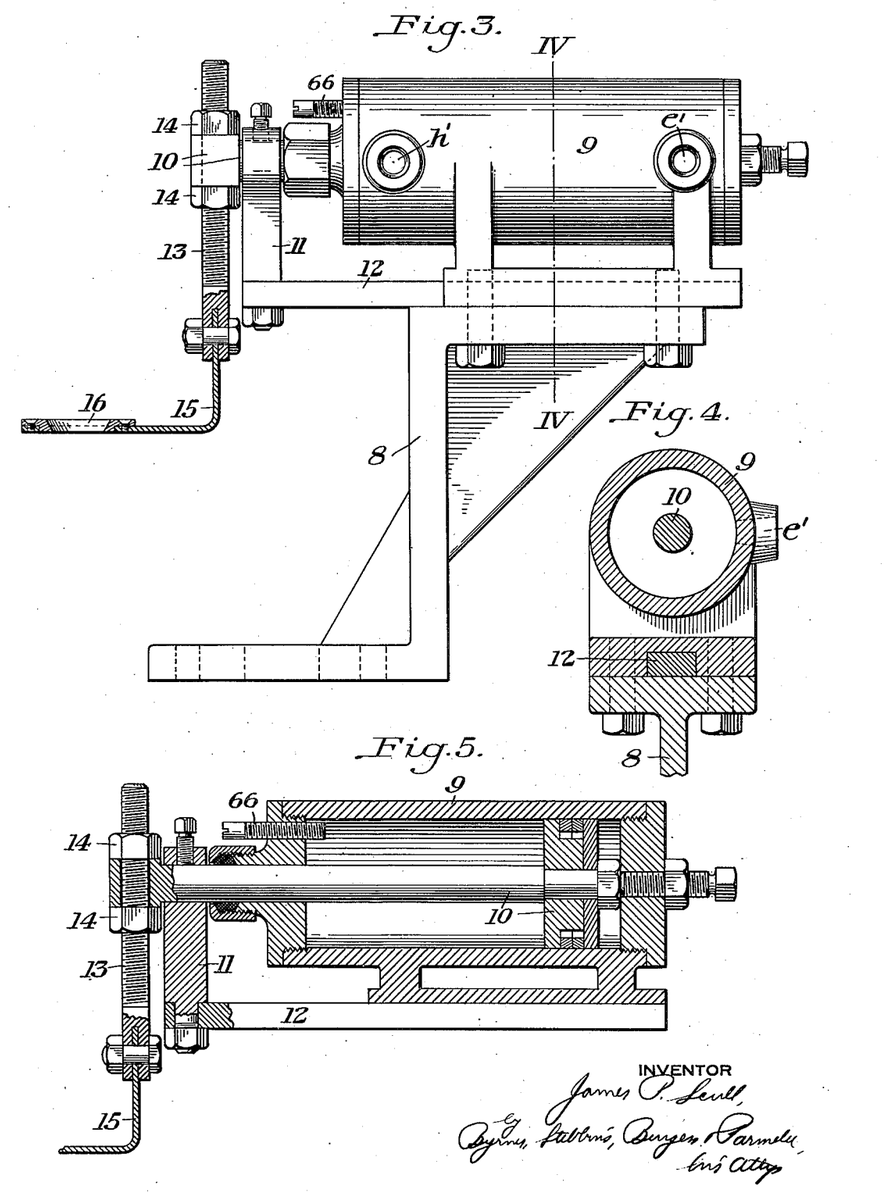
Figure 3 is a side elevation of the pouring guide, the operating motor, and the motor supporting bracket.
Figure 4 is a transverse sectional view on the line IV—IV of Figure 3.
Figure 5 is a longitudinal sectional view, partly in elevation and partly broken away, through the construction illustrated in Figures 3 and 4.
Figures 9, 10, 11:
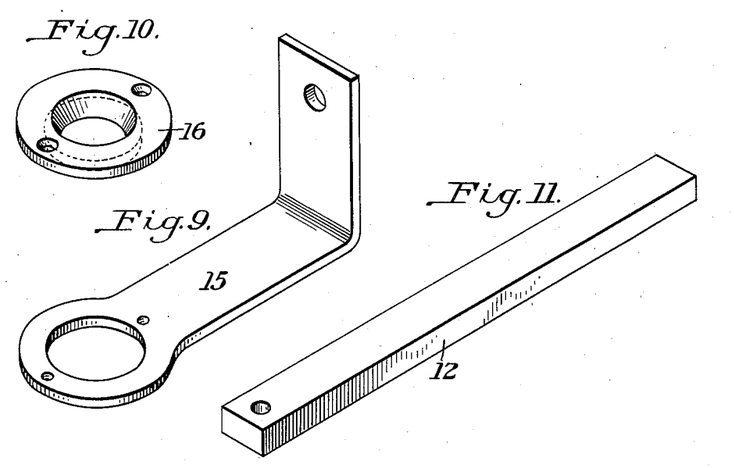
Figure 9 is a perspective view of the pouring guide holder.
Figure 10 is a perspective view of the pouring guide.
Figure 11 is a perspective view of the sliding guide for the pouring guide.

The motor 9 comprises a piston rod 10 having secured thereto a pusher finger 11 the opposite end of which is in turn secured to a longitudinally extending guide 12 adapted to slide in a suitable guide way formed in the base of the motor 9, as illustrated in Figure 4. At the outer end of the piston rod 10 is mounted a vertically adjustable support 13, adapted to be held in adjusted position by lock nuts 14, and carrying a pouring guide holder 15 at its lower end. This holder, as shown more particularly in Figure 9, has an opening in its forward end adapted to receive a pouring guide 16 which may be held in position therein in any desired manner. The pouring guide is adapted to occupy an operative position and inoperative position alternately and intermittently. In operative position the opening therethrough is in alignment with one of the blow molds 17 which are carried by the table 5 in uniformly spaced relationship. Meshing with the toothed periphery 18 of the sleeve 4 is a gear 19 connected with a second table 20 which carries a series of blank or press molds 21. The gearing ratio and location of the respective molds 17 and 21 is such that as the table 5 is rotated to bring successive molds into charging position, one of the molds on the table 20 is in alignment with the mold on table 5 which is in such position.

Figures 6, 6A, 6B:
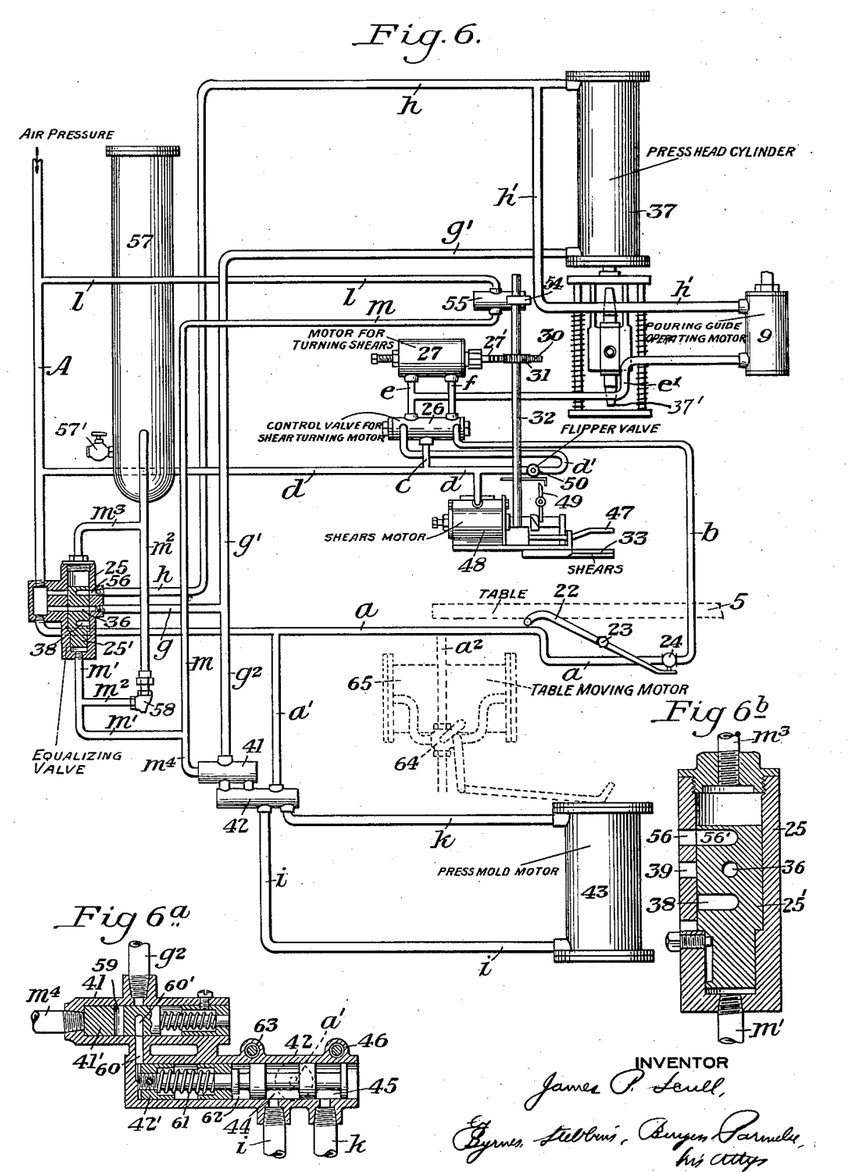
Figure 6 is a diagrammatic view illustrating the various operating motors, their connections, and controlling mechanism.
Figure 6a is a sectional view illustrating two of the operating valves.
Figure 6b is a sectional view through the equalizing valve.
Figure 13:
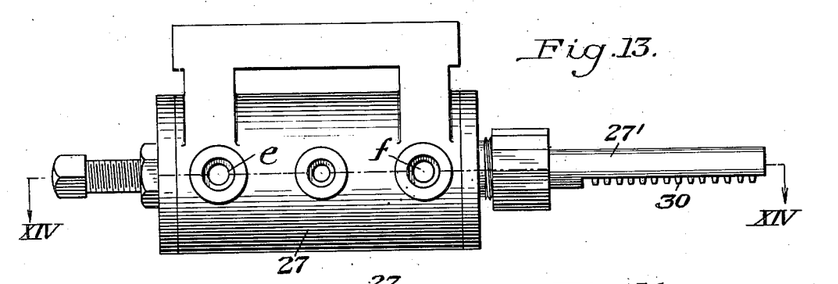
Figure 13 is a side elevation of the motor for turning the shears.
Figure 14:
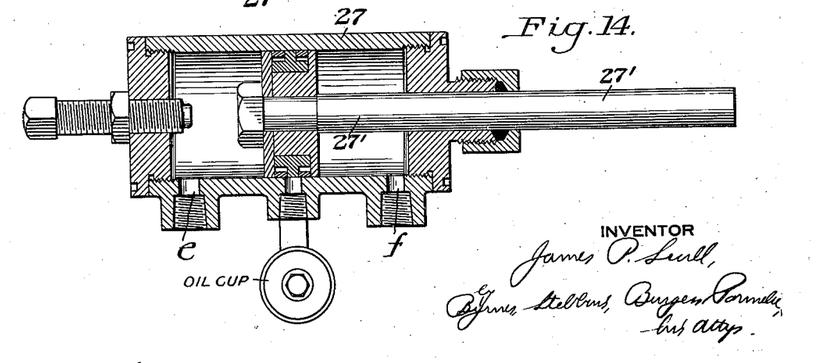
Figure 14 is a sectional view on the line XIV—XIV of Figure 13.

The construction of the table 5 and its operation may be of the nature described in Patent No. 975,758 of November 15, 1910, and in the present application these parts are only shown diagrammatically more particularly in Figure 6. With reference to this figure taken with Figures 1 and 2, it will be assumed that the table 5 has been rotated to bring one of the blow molds 17 and one of the blank or press molds 21 into coaxial relationship with the pouring guide 16. This movement of the table will have brought a projection thereon into contact with the upper end of a lever 22 having a pivotal connection 23 with the frame of the machine, as disclosed in Patent 1,017,870, whereby the lever is rocked. The lower end of the lever opens a valve 24 in the pipe $a$ receiving air under the pressure from the main pressure line A through a chamber on the equalizing valve 25 more fully described hereinafter. The opening of the valve 24 permits air under pressure to pass into pipe $b$ leading to the right hand end of the valve 26, shown in detail in Figures 7 and 8, which controls the shears turning motor 27, shown in detail in Figures 13 and 14. In the present embodiment of my invention the valve 26 and the motor 27, corresponding respectively to the valve 33 and the motor 28 of Patent 1,017,870, are made separate for ease in manufacture. The valve 26 has a pressure chamber 28 on one side thereof, which communicates through a pipe $c$ with a branch pressure pipe $d$ connected with the pipe A.

Figure 7:
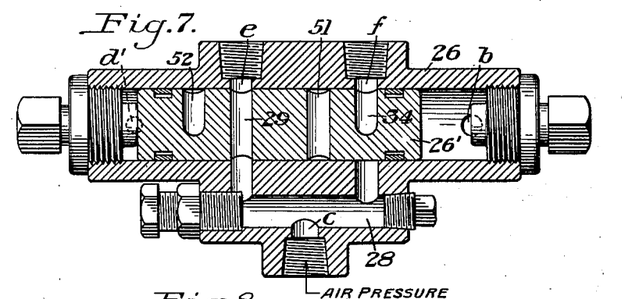
Figure 7 is a longitudinal sectional view through the control valve for the shears turning motor.

When the valve piston 26' moves to the left under the influence of air admitted at its right hand end, it brings port 29 therein into communication with pressure chamber 28, as shown in Figure 7, permitting air under pressure to pass through the valve piston into pipe $e$ leading to the left hand end of the shears turning motor 27. This moves the piston and piston rod 27' therein to the right. The piston rod 27' has formed thereon a rack bar 30 which meshes with a pinion 31 on a vertically extending shears carrying shaft 32, corresponding to the shaft 8 of Patent 1,017,870. This will rotate the shaft in such manner as to bring the shears 33 into operative position. The shaft 32 and the sleeve 4 rotate about axes which are not coaxial, whereby the table 5 and the shears will move in eccentric arcs with respect one to the other. The right hand end of shears turning motor 27 is connected by a line $f$ with the right hand end of valve 26, permitting the shears turning motor to exhaust through the angular port 34 in the piston 26' and exhaust opening 35.

At this time, also, air under pressure will pass from pipe $e$ into branch $e'$ leading to the left hand end of the pouring guide operating motor 9 as viewed in Figures 1 and 2, or to the right hand end thereof as viewed in Figures 3 and 5. This will move the piston and piston rod 10 outwardly to bring the pouring guide 16 into operative position in alignment with the mold to be charged.

During this same period the equalizing valve piston 25' in the valve 25 will be in its lower position, as shown in Figures 6 and 6$b$, and air under pressure will pass from line A through the port 36 into the line $g$ and its branches $g'$ and $g^2$. The branch $g'$ leads to the lower end of the press head cylinder 37 holding the piston therein in elevated position. The upper end of the press head cylinder is connected by a line $h$ with the equalizing valve 25 permitting the same to exhaust through angular port 56 in the piston 25′ and exhaust opening 56′. One end of the pouring guide operating motor 9 being connected by branch $h'$ with the line $h$, this motor is permitted to exhaust as the pouring guide is moved to its operative position.

The branch $g^2$ leads to the valve 41 which cooperates with the valve 42 which in turn controls the position of the press mold motor 43. At the time described, that is, with one of the molds on table 5 in receiving position, the pistons 41′ and 42′ are in the position illustrated in Figure 6a. Air under pressure will therefore pass through branch $a'$, port 44 and line $i$ to the lower end of the press mold motor 43. This raises the piston 43′ therein and engages and moves one of the press molds 21 into position within one of the blow molds 17 as described more fully in Patent 1,017,870, and as shown in Figure 1 herein. The upper end of the motor 43 is connected by line $k$ with valve 42 and exhausts through port 45 and opening 46.

Figure 8:
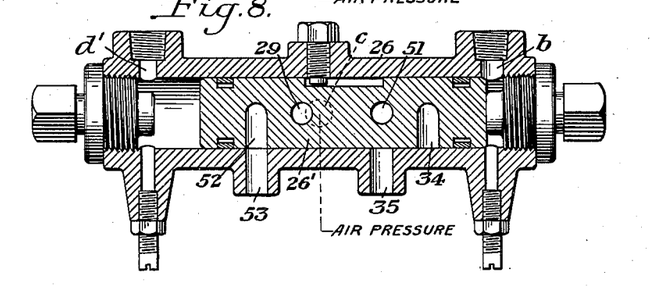
Figure 8 is a view, similar to Figure 7 but taken at right angles thereto and illustrating the valve piston in another position.

With the parts in this position, an operator gathers the desired amount of glass on his punty and brings it over the pouring guide 16, permitting it to drop into the mold to be charged. He then rests his punty on an operating punty trip lever 47 which operates the shears motor 48 as described more fully in Patent 1,017,870 referred to. This moves the shears to closed position and severs the gather permitting the severed portion to drop through the pouring guide 16. Upon releasing the punty trip lever 47, the shears return to open position. This movement operates a trip 49 which in turn opens a flipper valve 50 in the line $d$, thereby permitting air under pressure to flow from line $d$ into branch $d'$ leading to the left hand end of the shears motor control valve 26. This moves the piston 26′ therein to the right, as shown in Figure 8, and brings port 51 therein into communication with the pressure chamber 28. Air passes through this port and pipe $f$ to the right hand end of the shears turning motor 27, causing the piston rod 27′ to move to the left. At this time the pipe $e$ and its branch $e'$ are in communication with an angular exhaust port 52 whereby the motor 27 may exhaust therethrough to openings 53.

The movement of the piston rod 27′ rotates the vertical shaft 32 through substantially 90° and thereby moves the shears to inoperative position. Near the end of this rotational movement, a cam 54, on the shaft 32, opens valve 55 and permits air under pressure to flow from pressure line A through line 1 and valve 55 to the line $m$ and branch $m'$ leading to the bottom of the equalizing valve 25. This raises the piston 25′ therein whereby the line $g$ and its branches $g'$ and $g^2$ are opened to exhaust through the angular port 38 and the opening 39, and the line $h$ and its branch $h'$ are connected through port 36 with air under pressure. The piston 10 has an area materially less than the area of the piston operating in the press head cylinder 37, whereby the piston 10 is operated to withdraw the pouring guide before the piston in the press head cylinder is moved to lower position. This is due primarily to the difference in area of the respective pistons, and the difference in the time required to build up the necessary operating pressure. The pouring guide having been moved to inoperative position, the piston in the press head cylinder may descend, as set forth in Patent 1,017,870 and causing the forming element 37′ carried thereby to perform the desired operation on the glass within the mold at the charging station. The motor 9 during this movement exhausts through the branch $e'$.

Air under pressure in addition to being supplied to the bottom of the equalizing valve 25, is also supplied through a branch $m^2$ to air equalizing or timing chamber 57, the effective capacity of which may be varied as clearly described in the Headley and Bard patent referred to, the branch $m^2$ being provided with a regulable restricting valve 58 to control the rate of flow into the equalizing chamber. This chamber is connected by a branch $m^3$ with the top of the equalizing valve 25, whereby when the requisite pressure has been built up in the chamber 57 the piston 25′ will again be moved to its lower position due to the greater area of its upper end as compared with the lower end. This movement will again connect the line $g$ and its branches $g'$ and $g^2$ with pressure, and the line $h$ and its branch $h'$ with exhaust, permitting the piston in the press head cylinder 37 to rise away from the charged mold. The length of time during which this piston remained in its lower position is obviously dependent upon the effective area of the chamber 57, the adjustment of its valve 58, and adjustable valve 57′ provided for the chamber 57, so that the duration of operation of the piston may be easily varied or timed.

During the time the valve 25′ was being moved first in one direction and then the other, air under pressure was being supplied through the branch $m^4$ to the left hand end of the valve 41, moving the piston therein to the right. This brings the port 59 into communication with the branch $g^2$, whereby when the valve 25′ returns to lower position and pressure is re-established in the branch $g^2$, air will flow through port 59 and port 60 to the left of piston 42′, moving this piston to the right against the action of spring 61. This will connect branch $a'$ through port 44 with the line $k$ to lower the piston in the press mold motor 43, and permit the line $i$ to exhaust through port 62 and exhaust opening 63.

The table 5 is now free to rotate, and the downward movement of the piston in the press mold motor operates a valve 64 permitting air to pass through branch $a^2$ to the table moving motor 65. (This is fully described in Patent No. 975,758, before referred to.) This moves the table the required distance to bring a new mold 17 into charging position. The movement of the table will again actuate lever 22 to open valve 24 and permit air to move the valve piston 26' to the left. This will supply air to the left hand end of the shears turning motor 27 for moving the piston rod 27' to return the shears to operative position, and air to the pouring guide operating motor 9 for returning the pouring guide 16 to operative position. The parts will now all be in position for another complete cycle of operation, the valve 55 being moved to closed position when the shears are returned to operative position. As soon as the valve 55 closes, pressure is relieved from the pipe $m$ and its branches $m'$, $m^2$, $m^3$ and $m^4$, whereby a suitable spring returns the piston 41' to normal position, and spring 61 effects a like movement of piston 42'. The air at the left of piston 42' exhausts through port 60 and angular port 60' in piston 41'.

The adjustable support 13 enables the pouring guide to be vertically adjusted to any desired position in accordance with the height of the bottles being made, and the guide 12 prevents undue lateral movement, thereby ensuring proper position of the pouring guide with respect to lateral movement. The motor 9 may be provided with an adjustable stop 66 whereby the length of the stroke of the piston 10 may be varied to ensure the proper movement to effect registration of the pouring guide and the molds 17 in an endwise direction.

By reason of the independent controlling mechanism for the pouring guide, it need not leave operative position as soon as the shears, but may remain until air is admitted to the press head cylinder 37, when it is automatically moved to inoperative position. The advantages of the present invention arise from the provision of some mechanism such that the desired dwell may be produced to ensure passage of the entire severed charge of glass into the proper mold without retarding the operation of the machine or decreasing its output.

I claim:

1. The combination with a glass working machine having molds for the reception of glass and means mounted above the same for operating on the glass in the molds, together with actuating devices for the glass operating means, of shearing means for severing the glass charged to said molds, fluid controlled means for operating said shearing means, a movable mount carrying both of said last mentioned means, means for imparting movement to said mount in two directions whereby said shearing means and its operating means may be carried toward and away from a mold, a pouring guide, and means for moving said pouring guide to operative and inoperative positions, said last mentioned means removing the guide before the glass operating means operates on the glass but permitting the pouring guide to dwell in operative position over a charged mold after the movement of the shearing means away from said mold, substantially as described.

2. The combination with a glass working machine having molds for the reception of glass and means mounted above the same for operating on the glass in the molds, together with actuating devices for the glass operating means, of shearing means for severing the glass charged to said molds, fluid controlled means for operating said shearing means, a vertical shaft carrying the shearing means and the operating means therefor, means for imparting movement to said shaft whereby said shearing means and its operating means may be moved to and away from a mold, a pouring guide, and means for moving said pouring guide to operative and inoperative positions, said last mentioned means removing the guide before the glass operating means operates on the glass but permitting the pouring guide to dwell in operative position over a charged mold after the movement of the shearing means away from said mold, substantially as described.

3. The combination with a glass working machine having molds for the reception of glass, of means for rotating said molds, shearing means for the glass, operating means therefor, a vertical shaft disposed beyond the path of the molds and carrying both the shearing means and the operating means therefor, means for imparting limited movement to said shaft in two directions whereby the shearing means and its operating means may be bodily moved to operative and inoperative positions with respect to a mold, a pouring guide, and means for moving said pouring guide to operative and inoperative positions, said last mentioned means permitting the pouring guide to dwell in operative position over a charged mold after the movement of the shearing means away from said mold but removing the guide from above the mold before the glass charged therein is operated on, substantially as described.

4. In a glass working machine, the combination with a mold table and a mold carried thereby, of shearing means, a fluid controlled piston for actuating said means, a vertical shaft carrying said piston, and means for moving said shaft whereby the shears and piston may be carried bodily to operative and inoperative positions with respect to said mold, said latter elements moving in the arc of a circle eccentric to the arc through which the mold is moved, a pouring guide, and means for moving said pouring guide to operative and inoperative positions, said last mentioned means permitting the pouring guide to dwell in operative position over a charged mold after the movement of the shearing means away from said mold but removing the guide from above the mold before the glass charged therein is operated on, substantially as described.

5. In a glass working machine, the combination with a rotatable mold table and a series of molds carried thereby, of shearing means for severing glass charged to said molds, a piston for actuating said shearing means, a vertical shaft carrying said piston and having limited movement, means for setting the shearing means in operation, means operable upon the retraction of the same for moving said shaft whereby the shearing means and piston may be carried bodily to operative and inoperative positions with respect to a mold, a pouring guide, and means for moving said pouring guide to operative and inoperative positions, said last mentioned means permitting the pouring guide to dwell in operative position over a charged mold after the movement of the shearing means away from said mold but removing the guide from above the mold before the glass charged therein is operated on, substantially as described.

6. The combination, in a glass working machine, of a frame and a vertical shaft carried thereby, shearing means carried by said vertical shaft, a cylinder, a pistol in said cylinder in engagement with said shaft, means for operating said piston to effect movement of the shaft whereby the shearing means may be moved away from a mold, a pouring guide, and means for moving said pouring guide to operative and inoperative positions, said last mentioned means permitting the pouring guide to dwell in operative position over a charged mold after the movement of the shearing means away from said mold but removing the guide from above the mold before the glass charged therein is operated on, substantially as described.

7. In a glass working machine, a mold table, a mold carried thereby, shearing means, a piston for actuating said means, means for bodily moving said piston whereby the shearing means may be shifted away from the mold, means for actuating the shears shifting device upon the return movement of the piston for operating the shears, a pouring guide, and means for moving said pouring guide to operative and inoperative positions, said last mentioned means permitting the pouring guide to dwell in operative position over a charged mold after the movement of the shearing means away from said mold but removing the guide from above the mold before the glass charged therein is operated on, substantially as described.

8. In a glass working machine, a mold table, a plurality of molds carried thereby, means for rotating said table, shearing means for glass introduced into the molds, a movable stem carrying said shearing means, a fluid operated piston for operating the shears, a fluid operated piston for rotating said stem, means for operating on the glass introduced into the molds, a cam on said stem for setting said means in operation, a pouring guide, and means for moving said pouring guide to operative and inoperative positions, said last mentioned means permitting the pouring guide to dwell in operative position over a charged mold after the movement of the shearing means away from said mold but causing the removal thereof before the glass is operated on, substantially as described.

9. In a glass working machine, the combination with a mold table and a mold carried thereby, of shearing means comprising a pair of pivoted blades, means for actuating said shears, means for shifting said shears, a press mold, means actuated by the shifting device to raise the press mold, a pouring guide, and means for moving said pouring guide to operative and inoperative positions, said last mentioned means permitting the pouring guide to dwell in operative position over a charged mold after the movement of the shearing means away from said mold but removing it before the glass is operated on, substantially as described.

10. In a glass working machine, the combination with a mold table and a mold carried thereby, of shearing means comprising a pair of pivoted blades, means for actuating said shears, means for shifting said shears, a press mold, means actuated by the shifting device to raise the press mold, a pouring guide, and means for moving said pouring guide to inoperative position, said guide removing means being actuated by the shifting device, substantially as described.

11. The combination, in a glass working machine, of a frame, a vertical shaft carried thereby, shearing means carried by said shaft, means for moving said shaft to shift the shears away from operative position, a fluid actuated press head cylinder, a valve controlling the direction of motive fluid to said cylinder, means on said shaft for actuating said valve when the shaft turns, a pouring guide, and means for moving said pouring guide laterally to operative and inoperative positions, said last mentioned means permitting the pouring guide to dwell in operative position over a charged mold after the movement of the shearing means away from said mold, substantially as described.

12. The combination, in a glass working machine, of a frame, a vertical shaft carried thereby, shearing means carried by said shaft, means for moving said shaft to shift the shears away from operative position, a fluid actuated press head cylinder, a valve controlling the direction of motive fluid to said cylinder, means on said shaft for actuating said valve when the shaft turns, a pouring guide, and a motor for operating the same, said motor being operated for moving the pouring guide laterally to inoperative position by said last mentioned means, substantially as described.

13. The combination, in a glass working machine, of a frame, a vertical shaft carried thereby, shearing means carried by said shaft, means for moving said shaft to shift the shears from operative position, a fluid actuated press head cylinder, a press mold, fluid actuated means controlling the movement thereof, a valve controlling the direction of motive fluid to the press head cylinder and the means for actuating the press mold, means on said shaft for actuating said valve when the shaft turns, a pouring guide, and means for moving said pouring guide to operative and inoperative positions, said last mentioned means permitting the pouring guide to dwell in operative position over a charged mold after the movement of the shearing means away from said mold but removing the guide before pressing the glass, substantially as described.

14. The combination with a glass working machine having a rotatable table and a mold carried thereby for the reception of a charge of glass and rotated therewith in a circular arc, of means for severing the charge from the supply, a support for said severing means movably mounted beyond the arc of rotation of said mold, automatically operated means for shifting the severing means and its support bodily to and from operative position, a pouring guide, and means for moving said pouring guide to operative and inoperative positions, said last mentioned means permitting the pouring guide to dwell in operative position over a charged mold after the movement of the shearing means away from said mold but removing it before working the glass in the mold, substantially as described.

15. The combination with a glass working machine having a rotatable table and a mold carried thereby for the reception of a charge of glass and rotated therewith in a circular arc, of a pair of pivoted blades for severing the charge from the supply, a shaft supporting the same and movably mounted beyond the arc of rotation of said mold, automatically operated means for shifting said blades and their supporting shaft bodily to and from operative position, a pouring guide, and means for moving said pouring guide to operative and inoperative positions, said last mentioned means removing the guide before the glass is worked but permitting the pouring guide to dwell in operative position over a charged mold after the movement of the shearing means away from said mold, substantially as described.

16. In a glass working machine, a mold to receive a charge of glass, means for shearing the charge from the supply, means for bodily shifting the shearing means, means for actuating the shearing means when shifted, means for moving the mold into charging position, an operating member for performing an initial operation on the glass, means for moving the operating member into cooperative relation to the charge of glass within the mold at the charging position, a pouring guide, and means for shifting the same, said pouring guide shifting means being automatically operated after the action of the shearing means and before the performance of the initial operation on the glass by the operating member, substantially as described.

17. In a glass working machine, a mold to receive a charge of glass, means for shearing the charge from a source of supply, means for shifting the shearing means to and from operative position, means for operating the shearing means when in operative position, means for moving the mold into charging position, an operating member for performing an initial operation on the glass, means for lowering the operating member into cooperative relation to the charged mold while in charging position, a pouring guide, and means for shifting the pouring guide laterally to and from operative position, the means for lowering the operating member, shifting the pouring guide, and shifting the shears, being automatically operated after the action of the shearing means, substantially as described.

18. In a glass working machine, a mold to receive a charge of glass, means for shearing the charge from the supply, means for shifting the shearing means to and from operative position, an operating member for performing an initial operation on the glass, means for moving the mold into charging position, means for lowering the operating member into cooperative relation with the charged mold, a pouring guide, and means for shifting the pouring guide relatively to the operating member to and from operative position, said several means being automatically operated after the action of the shearing means, the guide being removed before the operating member is lowered to perform such initial operation substantially as described.

19. In a glass working machine, a mold to receive a charge of glass, means for shearing the charge from the supply, means for shifting the shearing means to and from operative position, an operating member for performing an initial operation on the glass, means for moving the mold into charging position, means for lowering the operating member into cooperative relation with the charged mold, a pouring guide, and means for shifting the pouring guide relatively to the operating member to and from operative position, said several means being automatically operated after the action of the shearing means to produce a period of dwell between the shifting of the shears to inoperative position and the shifting of the pouring guide to inoperative position and before the lowering of the operating member to perform such initial operation, substantially as described.

20. In a glass working machine, a plurality of molds, means for moving the molds successively to charging position, means for shearing the charge of glass introduced into each mold, means for operating said shearing means, a pouring guide adapted to successively cooperate with the molds, and means for moving said pouring guide laterally to and from operative position relative to the molds, and mechanism controlling both of said means and timing the operation thereof to insure a complete shearing cycle prior to movement of said guide away from operative position, substantially as described.

21. In a glass working machine, a mold, means for moving the mold to charging position, means for shearing the charge of glass introduced into said mold, means for moving the shearing means to operative and inoperative positions relative to a mold and for effecting a shearing movement, a pouring guide, and independent means for moving said pouring guide laterally to and from operative position relative to the mold, said independent means being automatically operated after the operation of said shearing means and the return of the shearing means to inoperative position to produce a dwell between the return of the shearing means to inoperative position and the shifting of the pouring guide before working the glass, substantially as described.

22. In a glass working machine, a plurality of molds, means for moving the molds successively to charging position, a pouring guide adapted to successively cooperate with the molds, shearing means, mechanism for moving said pouring guide laterally to and from operative position with relation to said molds, said mechanism moving said guide from operative position at a different time from the movement of molding parts of said machine and subsequently to a complete shearing cycle, and means at the charging position for performing an initial operation on the glass after a complete shearing cycle and after movement of the pouring guide laterally from a charged mold and before movement of the charged mold away from charging position.

23. In a glass working machine, a rotating table, a series of molds carried thereby, shearing means for cooperation with said molds for shearing the charges of glass supplied thereto while at a charging station, means for operating said shearing means, a pouring guide adapted to cooperate with each of said molds, means for moving said pouring guide to and from operative position, means for performing an initial operation on the glass charge in the mold while at the charging station, and mechanism controlled by the shearing means after each shearing operation for producing an operation of the pouring guide moving means and a subsequent operation of the means for performing the initial operation on the glass charge, substantially as described.

24. In a glass working machine, a rotating table, a series of molds carried thereby, shearing means for cooperation with said molds for shearing the charges of glass supplied thereto, means for operating said shearing means, a pouring guide adapted to cooperate with each of said molds at a charging station, means for moving said pouring guide to and from operative position, means for performing an initial operation on the charge in the mold while at the charging station, and mechanism controlled by the shearing means after each shearing operation for effecting operation of the pouring guide moving means followed by an operation of the means for performing an initial operation on the charge, said mechanism being effective for producing a period of dwell between the operation of the shearing means and the movement of the pouring guide from operative position, substantially as described.

25. In a glass working machine, a mold, means for moving the mold to charging position at a charging station, fluid pressure means for performing an initial operation on a charge in the mold while at said station, a pouring guide, fluid pressure means for moving the pouring guide to inoperative position, a single fluid pressure line leading to both of said fluid pressure means, said last mentioned means requiring a lower operating pressure than said first mentioned fluid operated means so that it will be actuated before the first fluid pressure means, and means for simultaneously directing air under pressure to said two last mentioned means, substantially as described.

26. In a glass working machine, a mold, means for moving the mold to charging position at a charging station, fluid pressure means for performing an initial operation on a charge in the mold while at said station, a laterally movable guide, fluid pressure means for moving the pouring guide to inoperative position, said last mentioned means requiring a lower operating pressure than said first mentioned fluid operated means, shears, and means controlled by said shears for automatically simultaneously directing air under pressure to said two last mentioned means to first move the guide and then the operating means, substantially as described.

27. In a glass working machine, the combination with a mold table and a mold carried thereby, of shearing means comprising a pair of pivoted blades, means for actuating said shears, means for shifting said shears, a pouring guide, and means for moving said pouring guide to inoperative position, said means being actuated by the shifting device, substantially as described.

28. In a glass working machine, a mold to receive a charge of glass, means for shearing the charge from the supply, means for shifting the shearing means, means for moving the mold into charging position, an operating member for performing an initial operation on the glass, means for bringing the operating member into cooperative relation to the charge of glass within the mold at charging position, a pouring guide, and means for shifting the same laterally from between the mold and operating member before the operating member performs such initial operation on the glass, said pouring guide shifting means being automatically operated after the action of the shearing means substantially as described.

29. In a glass working machine, a mold to receive a charge of glass, means for shearing the charge from the supply, means for shifting the shearing means to and from operative position, means for operating the shearing means, means for moving the mold into charging position, an operating member for performing an initial operation on the glass, means for moving the operating member into cooperative relation to the charged mold while in charging position, a pouring guide, and means for shifting the pouring guide laterally to and from operative position, the means for moving the operating member, shifting the pouring guide, and shifting the shears, being automatically operated after the action of the shearing means to first shift the guide and then the operating member to perform such initial operation, substantially as described.

30. In a glass working machine, a mold to receive a charge of glass, means for shearing the charge from the supply, means for shifting the shearing means to and from operative position, means for moving the mold into charging position, an operating member for performing an initial operation on the glass, means for moving the operating member into cooperative relation with the charged mold, a pouring guide, and means for shifting the pouring guide laterally to and from operative position, said several means being automatically operated after the action of the shearing means to first shift the guide and then the operating member to perform such initial operation, substantially as described.

31. In a glass working machine, a mold to receive a charge of glass, means for shearing the charge from the supply, means for shifting the shearing means to and from operative position, means for moving the mold into charging position, an operating member for performing an initial operation on the glass, means for moving the operating member into cooperative relation with the charged mold, a pouring guide, and means for shifting the pouring guide laterally to and from operative position, said several means being automatically operated after the action of the shearing means to produce a period of dwell between the shifting of the shears to inoperative position and the shifting of the pouring guide to inoperative position and to then move the operating member to perform such initial operation, substantially as described.

32. In a glass working machine, a mold, means for moving the mold to charging position, a pouring guide cooperating with said mold, and means including an equalizing valve having a differential piston area for moving said pouring guide to and from operative position with relation to said mold, said last mentioned means permitting the pouring guide to remain in operative position over a mold for a length of time sufficient to insure the passage of a charge of glass into the mold, substantially as described.

33. In a glass working machine, a rotating table, a series of molds carried thereby, shearing means for cooperation with said molds for shearing the charges of glass supplied thereto, means for operating said shearing means, a pouring guide adapted to cooperate with each of said molds, means for moving said pouring guide laterally relatively to the longitudinal axis of a mold to and from operative position, means for performing an initial operation on the charge in the mold while in charging position, and means controlled by the shearing means after each shearing operation for operating said two last mentioned means, said pouring guide being moved to inoperative position before the means for performing the initial operation on the glass is operated, substantially as described.

34. In a glass working machine, a mold, a laterally shiftable shear support, a laterally movable pouring guide, and means operable by the concluding movement of the shear support for effecting lateral movement of the pouring guide, substantially as described.

35. In a glass working machine, a mold, a bodily shiftable shear support, a bodily movable pouring guide, and means operable upon the concluding movement of the shear support for effecting movement of the pouring guide to inoperative position, substantially as described.

36. In a glass working machine, a mold, means for bringing the mold to a combined charging and operating station, a laterally shiftable shear support, a bodily movable pouring guide, means operable upon the concluding movement of the shear support for effecting movement of the pouring guide to inoperative position, an operating member at said station, and means operable after movement of the pouring guide to inoperative position for bringing said operating member into cooperative relation to a charged mold, substantially as described.

37. In a glass working machine, a plurality of molds, means for successively bringing the molds to a combined charging and operating station, means for shearing the charge of glass introduced into each mold, means for operating said shearing means, a pouring guide adapted to successively cooperate with the molds, means controlled by the shears for moving the pouring guide to and from operative position relative to the molds, and means at said station for operating on the glass after movement of the pouring guide to inoperative position, substantially as described.

38. In a glass working machine, a plurality of molds, pouring guide means movable into and out of cooperative relation with a mold to be charged, shearing means, shifting mechanism for bodily shifting the shearing means, and separate actuating mechanism for the pouring guide controlled by the bodily shifting of the shearing means and operable in timed relation to the shearing means and after the shearing operation, substantially as described.

39. In a glass working machine, a plurality of molds, pouring guide means movable into and out of cooperative relation with a mold to be charged, shearing means, actuating mechanism for the shearing means, shifting means for the shearing means, and separate actuating mechanism for the pouring guide operable in timed relation to the shearing means and after the shearing operation, said separate actuating mechanism being controlled by the shifting of the shearing means, substantially as described.

40. In a glass working machine, a plurality of molds, pouring guide means movable into and out of cooperative relation with a mold to be charged, bodily shiftable shearing means, actuating mechanism for shifting the shearing means, mechanism for actuating the shears, and separate actuating mechanism for the pouring guide operable in timed relation to the operation of the shearing means and after the conclusion of the shifting movement, thereof, substantially as described.

41. In a glass working machine, a mold to receive a charge of glass, means for shearing the charge from the supply, means for actuating the shearing means, means for bringing a mold into charging position, an operating member, means for moving the operating member into cooperative relation to the charge of glass within the mold, a pouring guide and means for shifting the pouring guide laterally, said pouring guide shifting means being operated by and after the action of the shearing means and before the operating member operates on the glass, substantially as described.

42. In a glass working machine, the combination with a mold support and a mold carried thereby, of shearing means comprising a pair of pivoted blades, means for actuating said shears, means for shifting said shears, a pouring guide and means for moving said pouring guide laterally from above the mold to inoperative position, said guide moving means being controlled by said shifting device, substantially as described.

43. In a glass working machine, a mold to receive a charge of glass, means for shearing the charge, means for operating the shearing means, means for moving the mold to a charging station, an operating member at the charging station for operating on the glass, means for moving the operating member into cooperative relation to the charge of glass within a mold at the charging station, a pouring guide, and means for shifting the pouring guide, said pouring guide shifting means being operated after and in timed relation to the action of the shearing means and before the performance of an initial operation on the glass by the operating member, substantially as described.

44. In a glass working machine, a mold to receive a charge of glass at a charging station, means for shearing the charge, means for actuating the shearing means, means for moving the mold into charging position, an operating member for performing an operation on the glass, means for moving the operating member into cooperative relation to the charge of glass within a mold at the charging station, a pouring guide movable relatively to and independent of the operating member, and means for moving the pouring guide, said pouring guide moving means being automatically operated after the action of the shearing means and before the performance of an operation on the glass by the operating member, substantially as described.

45. In a glass working machine, a mold to receive a charge of glass, means for shearing the charge, means for actuating the shearing means, means for moving the mold into charging position, an operating member for performing an operation on the glass through the charging end of the mold, means for moving the operating member into cooperative relation to the charge of glass within the mold, a pouring guide, timing means operable while the mold is stationary for shifting the pouring guide relatively to the operating member, said pouring guide shifting means being automatically operated after the action of the shearing means and before the performance of an operation on the glass by the operating member, and operative connections between said timing means and said operating member, substantially as described.

46. In a glass working machine, a mold to receive a charge of glass, means for shearing the charge from a source of supply, means for shifting the shearing means to and from operative position, means for operating the shearing means when in operative position, means for moving the mold into charging position, an operating member for performing an operation on the glass, means for moving the operating member into cooperative relation to the charged mold while in charging position, a pouring guide movable relatively to the operating member, and means for shifting the pouring guide laterally from operative position while the mold is stationary, the means for moving the operating member, shifting the pouring guide, and shifting the shears being automatically operated after the action of the shearing means, substantially as described.

47. In a glass working machine, a mold to receive a charge of glass, means for shearing the charge, means for shifting the shearing means to and from operative position, means for moving the mold into charging position at a charging station, an operating member at said station for performing an operation on the glass, means for moving said operating member into cooperative relation with the charged mold at the charging station, a pouring guide, and means for shifting the pouring guide relatively to the operating member to and from operative position, said several means being automatically operated after the action of the shearing means, the guide being removed before the operating member is moved into said cooperative relation, substantially as described.

48. In a glass working machine, a plurality of molds, means for moving the molds successively to charging position, means for shearing the charge of glass introduced into each mold, means for bodily shifting the shearing means, means for operating the shearing means, a pouring guide means adapted to cooperate with the molds, and means for effecting movement of the pouring guide means from operative relation to the molds, there being mechanism controlled by the shifting of the shears for effecting movement of the pouring guide from operative position, substantially as described.

49. In a glass working machine, a rotating table, a series of molds carried thereby, shearing means cooperating with said molds for shearing the charges of glass supplied thereto at a charging station, means for operating said shearing means, a single pouring guide adapted to successively cooperate with all of said molds, means for moving said pouring guide to and from operative position, means at the charging station for performing an operation on the glass charge in the mold at said station, and means operated by the shearing means after each shearing operation for first effecting operation of the pouring guide moving means followed by subsequent operation of said means operating on the glass, substantially as described.

50. In a glass working machine, a mold to receive a charge of glass, means for shearing the charge from the supply, means for operating the shearing means, means for moving the mold into charging position at a charging station, an operating member at said station and above the mold for performing an operation on the glass charge in the mold at said station, means for bringing the operating member into cooperative relation to the charge of glass within the mold at the charging station, a pouring guide, and means for shifting the pouring guide laterally from between the mold and operating member before the operating member performs an operation on the glass, said pouring guide shifting means being automatically operated after the action of the shearing means and in timed relation thereto, substantially as described.

51. In a glass working apparatus, a mold, shearing mechanism, a movable guide for sheared glass, means for moving said mold to successive stations including a charging station at which the shearing mechanism and guide are located, means for performing an initial operation on the glass at the charging station, and means operable before the performance of said initial operation and before movement of the mold from the charging station for first operating said mechanism and thereafter moving said guide.

52. In a glass working machine, a plurality of molds, means for moving the molds successively to charging position, a pouring guide adapted to successively cooperate with the molds, shearing means, mechanism for moving the pouring guide to and from operative position with relation to the molds while stationary, said mechanism moving said guide from operative position at a different time from the movement of molding parts of said machine and subsequently to and in timed relation to a complete shearing cycle, timing means for controlling said mechanism and operative after a complete shearing cycle for causing said mechanism to move the guide from operative position, and means for operating on the glass in the charged mold at the charging station before movement of such mold away from said station and after movement of the pouring guide from operative relation to such mold.

53. In a glass working machine, a mold adapted to receive a charge of glass at a charging station, means for shearing the charge, means for actuating the shearing means, means for moving the mold into charging position, an operating member for performing an operation on the glass, means for moving the operating member into cooperative relation to the charge of glass within a mold at the charging station, a pouring guide movable relatively to and independent of the operating member, and means for moving the pouring guide, said pouring guide moving means being automatically operated by and after the action of the shearing means and before the performance of an operation on the glass by the operating member, substantially as described.

54. In a glass working machine, a mold adapted to receive a charge of glass at a charging station, means for shearing the charge, means for actuating the shearing means, means for moving the mold into charging position, an operating member for performing an operation on the glass, means for moving the operating member into cooperative relation to the charge of glass within a mold at the charging station, a pouring guide movable relatively to and independent of the operating member, and means for moving the pouring guide, said pouring guide moving means and said operating member being automatically operated by and after the action of the shearing means, said pouring guide being moved before the performance of an operation on the glass by the operation member, substantially as described.

55. In a glass working machine, a mold to receive a charge of glass, means for shearing the charge, means for actuating the shearing means, means for moving the mold into charging position, an operating member for performing an operation on the glass, means for moving the operating member into cooperative relation to the charge of glass within the mold, a pouring guide, and means operable by the shearing means upon completion of a shearing cycle for shifting the pouring guide relatively to a mold and for thereafter effecting a movement of the operating member for performing an operation on the glass.

In testimony whereof I have hereunto set my hand.

JAMES P. SCULL.